June 9, 1964   D. E. WRETLIND   3,136,211
PROJECTED MEDIA SCREEN
Filed Nov. 27, 1961

INVENTOR.
DALE E. WRETLIND
BY
Walter L. Wessendorf Jr.
attorney

United States Patent Office 3,136,211
Patented June 9, 1964

3,136,211
PROJECTED MEDIA SCREEN
Dale E. Wretlind, 1421 Van Antwerp Road,
Schenectady 9, N.Y.
Filed Nov. 27, 1961, Ser. No. 156,558
3 Claims. (Cl. 88—28.9)

This invention relates to a screen upon which may be projected film, slide, or opaque pictures and the like.

It is an object of this invention to provide a screen that enhances any three dimensional effect potential in the film, slide or opaque picture projected. Accordingly, the possible realization of the goal of "3-D" motion pictures, slide films, slides, and opaque projection without viewing glasses, special cameras, or projecting equipment should be appreciated.

It is a further object of this invention to provide a screen surface that is non-textured. It should be appreciated that a screen having a textured surface of any kind is a physical obstacle to viewing in depth. Often a viewer can actually see a reflecting surface of the screen, and when he cannot see the textured surface of the screen, he, nevertheless, responds to such existence. This invention removes that obstacle.

An additional object of this invention is to provide a screen that is literally a screen-in-depth. It should be appreciated that a two dimensional screen presents an obstacle to potential three dimensional image effect. This new and improved screen removes that obstacle.

A still further object of this invention is to provide a screen that will reflect a very pleasing image. It should be appreciated that the surfaces of textured two dimensional screens present obstacles to natural viewing with concomitant irritants. The new and improved screen which, for all intents and purposes, is literally invisible when an image is projected upon it, provides no irritants to the viewer.

Another object of this invention is to provide a screen that can be made from inexpensive and readily available materials, the construction of which does not require great technological knowledge or skill.

These and other objects of this invention should be appreciated from the detailed specification in conjunction with the drawings, in which like reference numerals refer to similar parts, in which.

Figure 1:
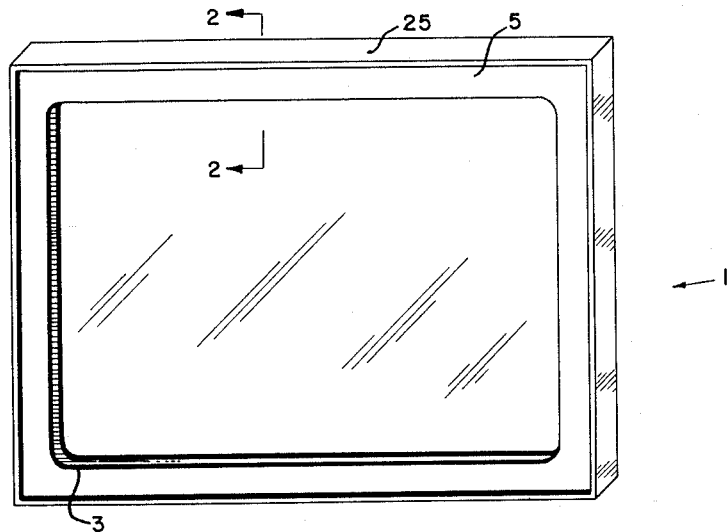
FIG. 1 is a front view of the screen in isometric projection.

In FIG. 1, reference numeral 1, refers generally to the assembled Projected Media Screen. Frame 3 in the preferred embodiment of the invention is L-shaped in cross section and made of suitable material such as aluminum. Abutting against frame 3 is the mask 5 made of suitable material such as paper or wood.

Stacked in back of the frame 3 are six non-textured translucent sheets of material, hereinafter referred to as screen layers, each one of which is constructed and arranged to occupy the dimensional area generated by frame 3. Each translucent sheet must have a glossy surface and a frosted surface.

In the preferred embodiment of the invention the material used for each translucent sheet is cellulose acetate which is the basic generic descriptive term. The particular cellulose acetate utilized is three-thousandths of an inch in thickness. This particular cellulose acetate is readily available in the form of manufactured sheet or film and is used by draftsmen in tracing drawings, and is ordered and purchased by draftsmen under the description ".003 AR drafting acetate".

The first screen layer 7 has its frosted surface arranged to receive the projection upon its surface. Contiguous therewith is screen layer 9 with its glossy surface arranged to receive the projection upon its surface. Contiguous therewith is screen layer 11 with its frosted surface arranged to receive the projection on its surface. Contiguous therewith is screen layer 13 with its glossy surface arranged to receive the projection upon its surface. The contiguous screen layers 7, 9, 11 and 13 may be referred to as a set of contiguous sheets.

Spacer strip 15, of suitable material, such as pasteboard, is inserted between screen layer 13 and screen layer 17. In the preferred embodiment of the invention spacer strip 15 should not exceed a thickness of 1/16 of an inch. Screen layer 17 is arranged with its glare surface to receive the projection upon its surface. Separating screen layer 17 and screen layer 21 is spacer strip 19 which is similar to spacer strip 15. Screen layer 21 is arranged to receive the projection upon its glare surface. It should be appreciated that spacer strips 15 and 19 occupy the dimensional area that is occupied by frame 3.

Figure 2:
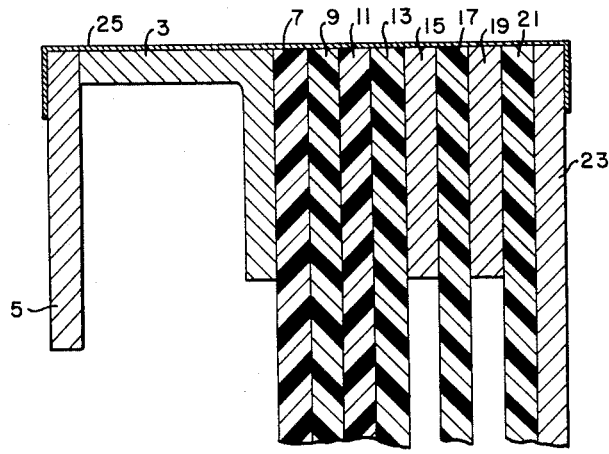
FIG. 2 is a partial sectional view of the screen taken along the line 22, FIG. 1.

Backing 23 is contiguous with screen layer 21. The entire assembly of the screen is secured by a cloth tape 25 as shown in FIGURE 2. Backing 23 is preferably of soft gray paper and not only protects the stacked screen layers from external elements, but also has utility in the absorption of light thereby providing a neutral effect and obviating the light characteristics of the pictures projected upon the screen.

In the practical embodiment of this invention as heretofore described the related problems of diffused image and a too-critical viewing angle have, for all intents and purposes, been solved. The more distance between the screen layers the more the image upon the screen is diffused and the narrower is the critical viewing angle. The practical aspect of the physical depth of the stack has been considered in the embodiment of this invention. Since the first four screen layers are contiguous, the related problems of diffused image and critical viewing angle are solved. The fact of the structural separation of the remaining screen layers considers and solves the problem of the achievement of image depth of the picture projected upon the screen. It should further be appreciated that having the glossy surfaces of four of the six sheets arranged forward solves the problem of a dark image on the screen. With the frosted surface of the first screen layer being arranged to receive the projection upon its surface, the problem of picking up external reflections is solved.

Having described my invention, I claim:

1. A reflecting projection screen for viewing projected images with depth effect comprising a set of contiguous sheets of translucent material separated from a sheet of translucent material, all of said sheets being superposed and mounted as a unit, the material of each one of said sheets being plane relatively thin cellulose acetate, each translucent sheet having its one surface frosted and its other surface glossy, the first sheet of said set of contiguous sheets having its frosted surface arranged to receive the projection thereon, each sheet of said set of contiguous sheets having its glossy surface arranged contiguous to the glossy surface of another sheet, and said separated sheet having its glossy surface arranged toward the projection source.

2. The subject matter as claimed in claim 1, wherein said projection screen has a backing and wherein said backing occupies the dimensional area of said screen in its rear portion.

3. A reflecting projection screen for viewing projected images with depth effect comprising a set of four contiguous sheets of translucent material separated from two sheets of translucent material, two spacer strips and a backing; all of said sheets being superposed and mounted as a unit, the material of each one of said sheets being plane relatively thin cellulose acetate, each translucent sheet having its one surface frosted and its other surface glossy, the first sheet of said set of four contiguous sheets having its frosted surface arranged to receive the projection thereon, the second sheet of said set of four contiguous sheets having its glossy surface arranged to receive the projection thereon, the third sheet of said set of four contiguous sheets having its frosted surface arranged to receive the projection thereon, the fourth sheet of said set of four contiguous sheets having its glossy surface arranged to receive the projection thereon, one of said spacer strips being disposed intermediate said fourth sheet of said set of four contiguous sheets and the first one of said two separated sheets, the other one of said spacer strips being disposed intermediate said two separated sheets, said separated sheets having their glossy surfaces arranged to receive the projection thereon, said backing being contiguous with the second one of said two separated sheets and said backing occupying the dimensional area of said screen in its rear portion.

References Cited in the file of this patent

UNITED STATES PATENTS

| | | |
|---|---|---|
| 1,594,951 | Headding et al. | Aug. 3, 1926 |
| 1,995,964 | Darimont | Mar. 26, 1935 |
| 2,234,950 | Barclay | Mar. 18, 1941 |
| 2,341,982 | Dillehay | Feb. 15, 1944 |

FOREIGN PATENTS

| | | |
|---|---|---|
| 696,821 | France | Oct. 20, 1930 |
| 1,191,425 | France | Apr. 13, 1959 |